(12) United States Patent
Lanver et al.

(10) Patent No.: US 11,712,679 B2
(45) Date of Patent: Aug. 1, 2023

(54) METHOD FOR PRODUCING CATALYST MONOLITHS FOR THE REFORMING OF HYDROCARBONS

(71) Applicant: BASF SE, Ludwigshafen am Rhein (DE)

(72) Inventors: Virginie Lanver, Ludwigshafen am Rhein (DE); Marcelo Daniel Kaufman Rechulski, Ludwigshafen am Rhein (DE); Stefan Altwasser, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 135 days.

(21) Appl. No.: 15/733,846

(22) PCT Filed: May 28, 2019

(86) PCT No.: PCT/EP2019/063762
§ 371 (c)(1),
(2) Date: Nov. 30, 2020

(87) PCT Pub. No.: WO2019/229040
PCT Pub. Date: Dec. 5, 2019

(65) Prior Publication Data
US 2021/0213422 A1     Jul. 15, 2021

(30) Foreign Application Priority Data
May 30, 2018    (EP) ..................................... 18175204

(51) Int. Cl.
*B01J 21/00*     (2006.01)
*B01J 23/78*     (2006.01)
(Continued)

(52) U.S. Cl.
CPC ............. *B01J 21/005* (2013.01); *B01J 23/78* (2013.01); *B01J 35/04* (2013.01); *B01J 35/1009* (2013.01);
(Continued)

(58) Field of Classification Search
CPC . B01J 21/005; B01J 23/78; B01J 35/04; B01J 35/1009; B01J 35/1014;
(Continued)

(56) References Cited

U.S. PATENT DOCUMENTS 6,027,326 A    2/2000 Cesarano et al.
6,401,795 B1   6/2002 Cesarano et al.
(Continued)

FOREIGN PATENT DOCUMENTS

CA    2 635 312    *  1/2013    ............ B01J 23/887
DE    19503522 A1     8/1996
(Continued)

OTHER PUBLICATIONS

C. Couroyer et al., "Methodology for Investigating the Mechanical Strength of Reforming Catalyst Beads." Oil & Gas Science and Technology—Rev. IFP, vol. 55, No. 1, pp. 67-85. (Year: 2000).*
(Continued)

*Primary Examiner* — Patricia L. Hailey
(74) *Attorney, Agent, or Firm* — Faegre Drinker Biddle & Reath LLP

(57) ABSTRACT

A method for producing a three-dimensional porous catalyst monolith of stacked catalyst fibers, comprising the following steps: a) Preparing a suspension paste in a liquid diluent of a reforming catalyst, and which suspension can furthermore comprise a binder material, all particles in the suspension having an average particle size in the range of from 0.5 to 500 μm, b) extruding the paste of step a) through one or more nozzles to form fibers, and depositing the extruded
(Continued)

Figure 1:
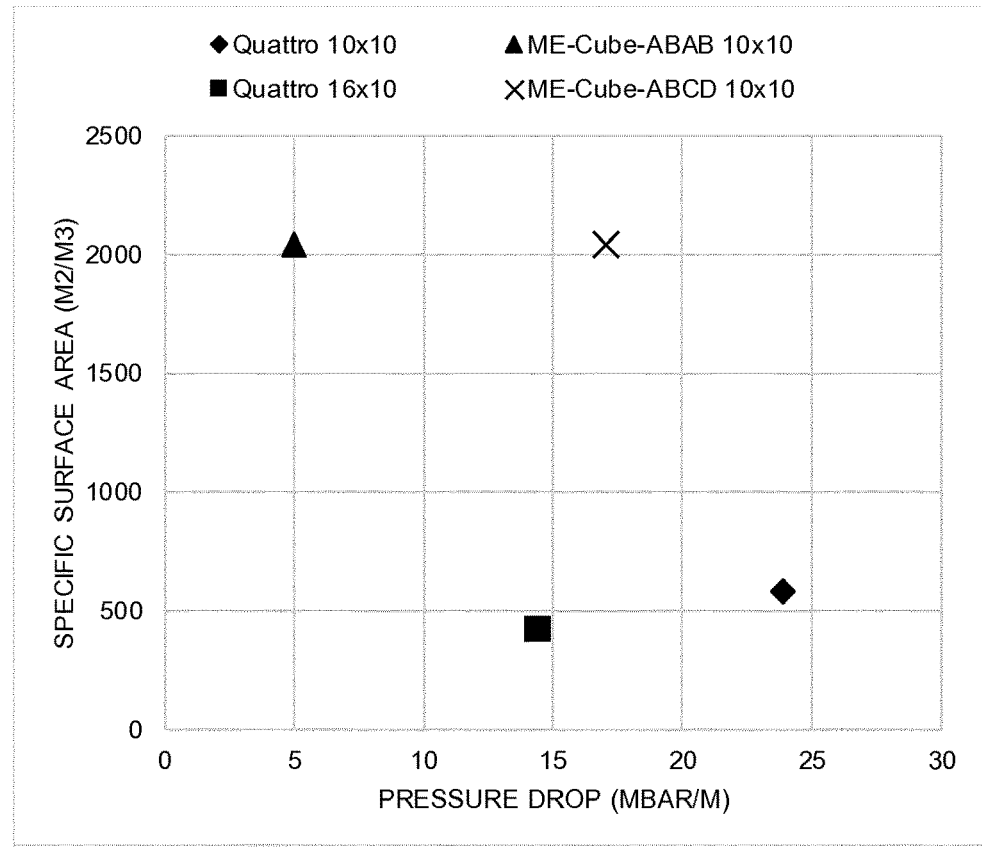

fibers to form a three-dimensional porous catalyst monolith precursor, c) drying the porous catalyst monolith precursor to remove the liquid diluent, d) calcining the porous catalyst monolith precursor to form the porous catalyst monolith.

18 Claims, 1 Drawing Sheet

(51) Int. Cl.
    *B01J 35/04*     (2006.01)
    *B01J 35/10*     (2006.01)
    *B01J 37/02*     (2006.01)
    *B82Y 30/00*     (2011.01)
    *B82Y 40/00*     (2011.01)

(52) U.S. Cl.
    CPC ....... *B01J 35/1014* (2013.01); *B01J 35/1019* (2013.01); *B01J 37/0236* (2013.01); *B82Y 30/00* (2013.01); *B82Y 40/00* (2013.01)

(58) Field of Classification Search
    CPC ... B01J 35/1019; B01J 37/0236; B82Y 30/00; B82Y 40/00; C01P 2002/30; C01P 2002/32; C01P 2002/72; C01P 2002/74
    USPC ........................................................ 502/328
    See application file for complete search history.

(56) References Cited

U.S. PATENT DOCUMENTS

| | | |
|---|---|---|
| 6,993,406 B1 | 1/2006 | Cesarano et al. |
| 7,527,671 B1 | 5/2009 | Stuecker et al. |
| 8,119,554 B2 | 2/2012 | Kashani-Shirazi et al. |
| 10,618,042 B1 * | 4/2020 | Zhao .................... B01J 35/1014 |
| 2019/0381491 A1 * | 12/2019 | Groeneveld ........... B01J 35/006 |

FOREIGN PATENT DOCUMENTS

| | | | | |
|---|---|---|---|---|
| EP | 0737646 | A2 * | 10/1996 | ............... C01B 3/38 |
| JP | H11-290685 | * | 10/1999 | ............. Y02P 20/52 |
| WO | 2013/068905 | A1 | 5/2013 | |
| WO | 2013/118078 | A1 | 8/2013 | |
| WO | 2016/097760 | A1 | 6/2016 | |
| WO | 2017/055565 | A1 | 4/2017 | |
| WO | 2018/099956 | A1 | 6/2018 | |

OTHER PUBLICATIONS

International Preliminary Report on Patentability received for PCT Patent Application No. PCT/EP2019/063762, dated Nov. 11, 2020, 31 pages.

International Search Report and Written Opinion received for PCT Patent Application No. PCT/EP2019/063762, dated Jul. 17, 2019, 21 pages.

John N. Stuecker et al: "Advanced Support Structures for Enhanced Catalytic Activity", Industrial & Engineering Chemistry Research, vol. 43, No. 1, Jan. 1, 2004, pp. 51-55, XP055415171.

Tubio Carmen R et al: "3D printing of a heterogeneous copper-based catalyst", Journal of Catalysis, Academic Press, Duluth, MN, US, vol. 334, Dec. 30, 2015, pp. 110-115, XP029391133.

Xintong Zhou et al: "Three-dimensional Printing for Catalytic Applications: Current Status and Perspectives", Advanced Functional Materials, vol. 27, No. 30, Aug. 1, 2017, p. 1701134, XP055522385.

* cited by examiner (F)

METHOD FOR PRODUCING CATALYST MONOLITHS FOR THE REFORMING OF HYDROCARBONS

CROSS-REFERENCE TO RELATED APPLICATIONS

This application is a national stage application (under 35 U.S.C. § 371) of PCT/EP2019/063762, filed May 28, 2019, which claims benefit of European Application No. 18175204.9, filed May 30, 2018, both of which are incorporated herein by reference in their entirety.

The invention relates to a method for producing a three-dimensional porous catalyst monolith of stacked catalyst fibers for the reforming of hydrocarbons, the thus obtained monolith and its use.

Typically, inorganic catalysts are produced as extruded strands or extruded monolith or honeycomb structures.

Alternative processes which allow for a greater variety of shapes in comparison to a linear stretched honeycomb structure can be prepared e.g. by rapid prototyping processes. The process described in U.S. Pat. No. 8,119,554, for example, involves the production of a shaped body by means of a powder-based rapid prototyping process, in which a binder material is selectively introduced in an inorganic catalyst powder to form the three-dimensional structure.

A further production process often named robocasting can be employed. In this method, a paste of the catalyst material particles is extruded into strands which are deposited in stacked layers to form the desired three-dimensional structure. Subsequently, the structure is dried and sintered. The production of regenerable diesel soot particulate filters by robocasting methods is disclosed in U.S. Pat. No. 7,527,671.

Reforming hydrocarbons to produce hydrogen and/or synthesis gas (syngas) is an important process for the chemical industry. It is however energy intensive and imposes high requirements on the catalyst. Currently the reformer reactors are filled with catalyst-shaped bodies produced either via tableting a catalyst powder (producing a so-called full catalyst tablet) or via impregnation of conventionally produced extrudates (producing so-called impregnated extrudates), see for example WO 2013/118078 and WO 2013/068905.

The geometry of the shaped bodies is defined to allow least possible reactor pressure drop, best radial thermal conductivity and highest reactive surface area among others. However, at the same time, the shape geometry is limited by its production method (i.e. tableting or extrusion). These limitations are reflected on sub-optimal catalyst performance: high reactor pressure drop, low specific surface area in packed bed, high specific weight in packed bed, and low mechanical stability of shaped bodies, etc.

The object underlying the present invention is to provide catalysts for the reforming of hydrocarbons, specifically in the presence of $CO_2$, which allow for a low reactor pressure drop, and high reactive surface area combined with a high mechanical stability, specifically crushing strength. Furthermore, the weight per volume of the catalyst should be low.

The object is achieved according to the present invention by a method for producing a three-dimensional porous catalyst monolith of stacked catalyst fibers, comprising the following steps:

a) preparing a suspension paste in a liquid diluent of particles of a catalyst A, which comprises at least nickel-magnesium mixed oxide and magnesium spinel and optionally aluminum oxide hydroxide, wherein the nickel-magnesium mixed oxide has an average crystallite size of ≤100 nm, preferably ≤70 nm, more preferably ≤40 nm, the magnesium spinel phase has an average crystallite size of ≤100 nm, preferably ≤70 nm, more preferably ≤40 nm, the proportion of nickel in the catalyst is in the region of 30 mol %, the proportion of magnesium is in the range 8-38 mol %, preferably 23-35 mol %, and the proportion of aluminum is in the range 50-70 mol % and the intensity of the diffraction reflection of the catalyst at 43.09°2θ is less than or equal to the intensity of the diffraction reflection at 44.82°2θ, with the intensity of the diffraction reflection at 43.08°2θ more preferably being less than the intensity of the reflection at 44.72°2θ or of a hexaaluminate-comprising catalyst B, which comprises cobalt and at least one further metal from the group consisting of Ba, Sr, La, or of precursors thereof, and which suspension can furthermore comprise a binder material, all particles in the suspension having an average particle size in the range of from 0.5 to 500 μm, b) extruding the paste of step a) through one or more nozzles to form fibers, and depositing the extruded fibers to form a three-dimensional porous catalyst monolith precursor, c) drying the porous catalyst monolith precursor to remove the liquid diluent, d) calcining the porous catalyst monolith precursor to form the porous catalyst monolith, wherein in case of catalyst A, the final product comprises at least nickel-magnesium mixed oxide and magnesium spinel and optionally aluminum oxide hydroxide, wherein the nickel-magnesium mixed oxide has an average crystallite size of ≤100 nm, preferably ≤70 nm, more preferably ≤40 nm, the magnesium spinel phase has an average crystallite size of ≤100 nm, preferably ≤70 nm, more preferably ≤40 nm, the proportion of nickel in the catalyst is in the region of 30 mol %, the proportion of magnesium is in the range 8-38 mol %, preferably 23-35 mol %, and the proportion of aluminum is in the range 50-70 mol % and the intensity of the diffraction reflection of the catalyst at 43.09°2θ is less than or equal to the intensity of the diffraction reflection at 44.82°2θ, with the intensity of the diffraction reflection at 43.08°2θ more preferably being less than the intensity of the reflection at 44.72°2θ, wherein in case of catalyst B, the final product comprises a hexaaluminate-comprising catalyst B, which comprises cobalt and at least one further metal from the group consisting of Ba, Sr, La, or of precursors thereof.

Generally, the low-temperature calcination is followed by the extrusion which is followed by the high-temperature calcination.

Furthermore, the object is achieved by a three-dimensional porous catalyst monolith of stacked catalyst fibers, obtainable by the above method.

The object is furthermore achieved by a control system data set containing a plurality of control instructions which when implemented on an additive production facility prompt the additive production facility to produce a three-dimensional porous catalyst monolith or three-dimensional porous catalyst monolith precursor as defined above or as obtainable by the method defined above.

The object is furthermore achieved by the use of the three-dimensional porous catalyst monolith for the reforming of hydrocarbons, preferably methane, in the presence of $CO_2$ and a corresponding process for the reforming of hydrocarbon-comprising compounds in $CO_2$ to give synthesis gas.

It was found that it is possible to produce the micro-extruded catalyst for reforming hydrocarbons in the presence of $CO_2$ (e.g. steam reforming, dry reforming, tri-reforming), but also reverse water-gas-shift, water-gas shift reactions), which has the benefit of improving the catalyst performance and process efficiency, more specifically the reactor pressure drop, specific surface area in packed bed, specific weight in packed bed and mechanical stability of shaped bodies. The use of the micro-extrudated shaped bodies is in general advantageous for reactions which take place mainly on the geometric surface area of the catalyst, which is typically the case for the reactions mentioned above.

In this respect, a three-dimensional monolith is a one-piece structure made of at least two stacked layers of fibers.

Step b) is preferably controlled by a control system data set or CAD file as described below, preferably implemented on a computer system.

According to the present invention, it has been found that particles of a catalyst A, which comprises at least nickel-magnesium mixed oxide and magnesium spinel and optionally aluminum oxide hydroxide, wherein the nickel-magnesium mixed oxide has an average crystallite size of ≤100 nm, preferably ≤70 nm, more preferably ≤40 nm, the magnesium spinel phase has an average crystallite size of ≤100 nm, preferably ≤70 nm, more preferably ≤40 nm, the proportion of nickel in the catalyst is in the region of 30 mol %, the proportion of magnesium is in the range 8-38 mol %, preferably 23-35 mol %, and the proportion of aluminum is in the range 50-70 mol % and the intensity of the diffraction reflection of the catalyst at 43.09°2θ is less than or equal to the intensity of the diffraction reflection at 44.82°2θ, with the intensity of the diffraction reflection at 43.08°2θ more preferably being less than the intensity of the reflection at 44.72°2θ, or of a hexaaluminate-comprising catalyst B, which comprises cobalt and at least one further metal from the group consisting of Ba, Sr, La, or of precursors thereof can be employed in a robocasting process, wherein preferably no treatment or sintering step at temperatures above 1000° C. is necessary in order to obtain mechanically stable catalytically active structures.

The process according to the present invention leads to porous catalyst monoliths having a low weight per piece or weight per volume combined with a high crushing strength and a low density of the monolith. The micro-extruded geometries have a significantly higher specific surface area and a low reactor pressure drop in comparison to known catalysts of this type.

In the process, particles of the final catalyst may be employed for preparing the suspension paste. Additionally, it is possible to employ a material which has only undergone a low-temperature calcination and which is afterwards in a shaping stage transferred to the particles of the desired particle size. A high-temperature calcination can be performed in step d). The molding of the particles to give the extrudates can be performed in step b).

Furthermore, it has been found that powders of the prefabricated reforming catalysts can be formed in a robocasting process without significantly changing their properties.

The robocasting process allows for the manufacture of three-dimensional porous catalyst monolith structures of stacked catalyst fibers, which have an increased external surface area and/or increased (side) crushing strength of preferably at least 60 N in comparison to normal extrudates.

This leads to higher activity and selectivity due to increased external surface area in diffusion-limited reactions, like reforming of hydrocarbons in the presence of $CO_2$, water-gas shift reactions and reverse water-gas shift reactions.

Furthermore, lower catalyst densities while maintaining the same catalytic activity in the reactor can be achieved due to well-ordered stackings of fibers. Any desired packing fraction of up to 70% is possible by employing regularly stacked catalyst fibers prepared according to the present invention.

A low pressure drop is possible, thus allowing to work with smaller fiber diameters compared to single extrudates.

The 3D structures formed from these smaller fibers—preferably having a (side) crushing strength of at least 60 N—are mechanically much stronger compared to the single extrudates, which are much too weak to be used in packed fixed-bed reactors.

When starting from powders of prefabricated catalysts, the original active metal (oxide or salt) dispersion on the catalyst support can be maintained.

The 3D robocasting technique employed according to the present invention is well established and can be performed as described in U.S. Pat. Nos. 7,527,671, 6,027,326, 6,401,795, Catalysis Today 273 (2016), pages 234 to 243, or Journal of Catalysis 334 (2016), pages 110 to 115, or U.S. Pat. No. 6,993,406.

The 3D robocasting technique can be used with catalyst formulations which can be based on pastes that are currently used in standard extrusion techniques provided the particle size is small enough to pass the extrusion nozzle. The extrusion formulation or paste contains preformed catalytic materials. If necessary, a binder can be added to the extrusion mixture.

Catalyst A:

The preformed catalytic materials mentioned here are obtained by a process by impregnation of a starting material with a fusible metal salt, wherein the production process comprises the following steps:

(i) contacting of a fusible metal salt and finely divided hydrotalcite-comprising starting material, (ii) intimate mixing of the fusible metal salt and the hydrotalcite-comprising starting material, (iii) thermal treatment of the fusible metal salt and the hydrotalcite-comprising starting material and heating of the mixture under conditions under which the metal salt is present in the form of a metal salt melt, preferably at a temperature in the range from 30 to 250° C., more preferably at a temperature in the range from 50 to 140° C., (iv) low-temperature calcination of the mixture at a temperature of <500° C., preferably at a temperature in the range from 250 to 500° C., with the duration of the low-temperature calcination preferably being in the range from 0.1 to 24 hours, (v) molding or shaping, (vi) high-temperature calcination of the mixture at a temperature of ≥500° C., preferably at a temperature in the range from 500 to 1000° C., with the duration of the high-temperature calcination preferably being in the range from 0.1 to 24 hours.

In a preferred embodiment, the calcination in process steps (iv) and (vi) is carried out using a defined heating rate and/or cooling rate, with the heating rate and/or cooling rate preferably being in the range from 0.01 to 10° C. per minute, more preferably in the range from 0.1 to 5° C. per minute.

In a preferred embodiment of the process, the shaping step (v) is followed by a sieving step.

Further preference is given to the metal salt fraction comprising a nickel salt, preferably nickel nitrate hexahydrate.

The hydrotalcite-comprising starting material preferably has defined proportions of magnesium and aluminum, preferably at least 10 mol % of magnesium and at least 10 mol % of aluminum.

In the catalyst of the invention, the nickel is present in very highly disperse form on the support oxide and the support oxide consists of or comprises very small particles of $MgAl_2O_4$. This results in catalysts having an improved property profile which is reflected both in an improved sintering stability at high temperatures and in an improved carbonization behavior.

The production process of the invention has advantages over production processes based on precipitation methods. The process of the invention forms no significant amount of process water or the process of the invention can also be carried out in such a way that absolutely no process water is formed. At the same time as avoiding the formation of process water, precipitation agents can also be saved. The problems associated with precipitation agents, namely introduction of contamination, can be prevented.

As regards the synthesis of the catalysts of the invention, it should be emphasized that an extremely energy-efficient and environmentally friendly process is provided because of the largely water-free production process.

Based on the total pore volume of the hydrotalcite-comprising support used, preferably hydrotalcite, the amount of water used is preferably ≤100%, more preferably ≤90%, even more preferably ≤70%, more preferably ≤50%, even more preferably ≤40%, particularly preferably ≤30% and more preferably ≤20%, of the total pore volume of the support. In a further preferred embodiment of the invention, the catalyst can be produced without addition of water since the water necessary for the synthesis is in this case supplied solely by the water of hydration of the salt.

In addition, a high metal loading or deposition of metal-containing phase on the support oxide or precipitation on a material which is a precursor of the support oxide can also be achieved by means of the process of the invention.

Without wishing to restrict the present invention by theoretical considerations, the following explanation of the formation of the catalyst of the invention appears plausible to us on the basis of structural studies on the formation mechanism: the treatment according to the invention of the hydrotalcite-comprising starting material with the nickel-comprising nitrate melt at a temperature of less than or equal to 500° C. leads to nanostructuring of the material. Magnesium is leached from the preformed layer-like carbon-comprising precursor material. Together with the nickel, a nanocrystalline mixed crystal phase $Ni_xMg_{(1-x)}O$ having a periclase-bunsenite structure is formed from the hydrotalcite. In addition, an Mg spinel phase and aluminum oxide phases which are partly amorphous and are transformed into crystalline spinels in which the particles are nanocrystalline only at relatively high calcination temperatures are formed.

Catalysts which at temperatures up to 1000° C. have nickel crystallites which are smaller than 100 nm, preferably smaller than or equal to 70 nm and particularly preferably smaller than or equal to 40 nm, and have a high resistance to sintering and carbonization processes are obtained. The present nanostructure of the material is particularly advantageous in respect of the catalytic properties thereof. In particular, the material according to the invention has been found to be an advantageous catalyst compared to the prior art which is particularly suitable for the reforming of gas streams which have a high carbon dioxide content.

In a preferred embodiment of the invention, the catalyst support comprises a magnesium spinel which is in intimate contact with a mixed oxide phase of nickel and magnesium. In this catalyst or catalyst precursor according to the invention, both the nickel-comprising phase and the spinel-comprising phase have very small crystallite sizes. In the case of the spinel-comprising phase, the average crystallite size is <00 nm, preferable ≤70 nm, more preferably ≤40 nm.

In a further preferred embodiment of the invention, the phase composition of the catalyst of the invention is distinguished by the intensity of the diffraction reflection at 43.15±0.15°2θ (2 theta) (d=2.09±0.01 Å) being less than or equal to the intensity of the diffraction reflection at 44.83±0.20°2θ (d=2.02±0.01 Å) with the intensity of the diffraction reflection at 43.15°±0.15°2θ (2 theta) (d=2.09±0.01 Å) more preferably being less than the intensity of the reflection at 44.83±0.20°2θ (d=2.02±0.01 Å) and the intensity ratio of the two diffraction reflections $I_{(43.15°)}/I_{(44.83°)}$ even more preferably being in the range from 0.3 to 1.0, preferably from 0.5 to 0.99, even more preferably from 0.6 to 0.97 and particularly preferably from 0.7 to 0.92.

The presence of small amounts of Ni spinel phase and possibly also NiO in the catalyst material of the invention or the catalyst precursor material is not ruled out. However, if an Ni spinel phase is present in the precursor material of the invention, it can be assumed that this will be transformed at the high pressures and the high temperatures of the use according to the invention of the catalysts.

The process of the invention enables all active metals which are present as a metal salt melt in the temperature range from 30° C. to 250° C. and result in catalysts which display catalytic activity as reforming catalyst to be applied to hydrotalcite or to hydrotalcite-comprising starting material. In a preferred embodiment, promoters can be added to the metal salt melt and/or further support oxides, pore-forming agents or binders can be introduced into the synthesis system in addition to the hydrotalcite-comprising starting material.

To produce the catalyst of the invention, preference is given to using metal salts which do not decompose during melting or in the case of which the decomposition is greatly inhibited kinetically. Examples of such metal salts are, inter alia, nitrates, nitrites, halides, chlorates, bromates, iodates, sulfates, sulfites. Particular preference is given to nitrates, nitrites and salt melts comprising nitrates and nitrites. The addition of particular additives to the melts, for example urea, ethylene glycol, is encompassed.

The fusible metal salts can comprise, for example, Na, K, Ca, Mg, Sr, Ba, Al, La, Y, Mo, W, Nb, Zr, Ti, Fe, Co, Ni, Cu, a platinum metal and/or Ce as cationic species. Possible anionic species are, in particular, nitrogen-comprising anions such as nitrates and nitrites. However, other anions such as halogens, sulfates and sulfites and other inorganic and organic anions known to those skilled in the art can in principle be used. The metal salts preferably comprise at least one nickel-comprising or cobalt-comprising component, preferably nickel nitrate hydrate or cobalt nitrate hydrate, for example hexahydrate.

The term hydrotalcite-comprising starting material as used in the present disclosure means that the material used comprises at least one hydrotalcite-like compound as significant constituent and can optionally comprise oxidic additive and/or secondary constituents. The total proportion of the hydrotalcite-like compound and the oxidic additive is greater than 50% by weight, preferably greater than 70% by weight and particularly preferably greater than 90% by weight. In addition to hydrotalcite-like compounds and oxidic additives, the hydrotalcite-comprising starting material can also comprise secondary constituents which comprise, for example, metal salts and serve, for example, to adapt the metal concentration of trivalent to divalent metal salt. Such secondary metal salt constituents are present in amounts of less than or equal to 10% by weight, preferably less than or equal to 5% by weight.

Hydrotalcite-like compounds are mixed hydroxides of divalent and trivalent metals which are made up of polycations and have a layer structure. Hydrotalcite-like compounds are also referred to in the literature as anionic clays, layered double hydroxides (=LDHs), Feitknecht compounds or double layer structures. Divalent metals which can be used are, for example, metals from the group consisting of Mg, Zn, Cu, Ni, Co, Mn, Ca and Fe and trivalent metals which can be used are, for example, metals from the group consisting of Al, Fe, Co, Mn, La, Ce and Cr.

In a preferred embodiment, the hydrotalcite-like compound is hydrotalcite. The hydrotalcites used for the process of the invention preferably comprise magnesium as divalent metal and aluminum as trivalent metal. The metals of the hydrotalcites used preferably comprise predominantly magnesium and aluminum.

The oxidic additive can also be a mixture, preferably a mixture comprising aluminum-comprising compounds. Examples of such aluminum-comprising oxidic additives are, inter alia, gibbsite, boehmite and pseudoboehmite. Typical contents of such aluminum oxides, hydroxides or oxide hydrates can be in the range from 30 to 95 percent by weight calculated on the basis of aluminum oxide (i.e. $Al_2O_3$). This corresponds to a molar proportion of aluminum based on total metal of from 26 to 84 mol %. Particular preference is given to the range from 50 to 80 percent by weight calculated on the basis of aluminum oxide. This corresponds to a molar proportion of aluminum based on total metal of from 44 to 70 mol %. Very particular preference is given to the range from 60 to 75 percent by weight calculated on the basis of aluminum oxide. This corresponds to a molar proportion of aluminum based on total metal of from 53 to 66 mol %.

The hydrotalcite-like compounds and the oxidic additive also display very intimate mixing.

Such mixing can be effected, for example, by physical mixing of hydrotalcite-like and aluminum hydroxide-comprising powders. For example, powder mixing can be carried out in suitable industrial apparatuses such as mixers. Such mixing processes are known to those skilled in the art. A further possibility is to mix the hydrotalcite-like powder and the aluminum hydroxide-comprising powder in suitable dispersion media. As dispersion media, it is possible to use, for example, water, alcohols such as methanol, ethanol, propanol, butanol, ethylene glycol and/or butanediol and ketones such as acetone or methyl ethyl ketone. It is also possible for the dispersion media to be present as mixtures and comprise surface-active agents such as surfactants. Examples of such surfactants are, inter alia, polyethylene glycols, Mersolates, carboxylates, long-chain ammonium compounds such as CTAB.

Another possible way of achieving intimate mixing is the direct synthesis of a mixture of hydrotalcite-like and aluminum hydroxide-comprising substances by precipitation reactions. Such processes can be carried out, inter alia, as described in DE 195 03 522 A1 by hydrolysis of water-sensitive precursors, which allows many possible compositions. Other alternative processes for producing mixtures of hydrotalcite-comprising and aluminum hydroxide-comprising substances can be carried out on the basis of precipitation reactions from aqueous media. For example, it is possible to use carbonate-comprising precipitates or carbon dioxide-comprising gas mixtures can be allowed to act under pressure on suitable precursor solutions of metal salts or metal hydroxides.

Examples of hydrotalcite-comprising starting materials used for the purposes of the invention are products from Sasol which are marketed under the trade name Pural MG (Pural MG5 to Pural MG70 are commercially available, where Pural MG70 is an Mg—Al hydrotalcite without addition of aluminum hydroxide). Intimate mixing of magnesium- and aluminum-comprising hydrotalcites with other carbonates, hydroxides or hydroxyl carbonates is also encompassed by the invention.

Preference is given to using hydrotalcites or hydrotalcite-like compounds having a particularly high purity for the process of the invention. The process for producing these hydrotalcite-like compounds which are particularly preferably used in the process of the invention is disclosed by J. P. van Berge et al. in DE 195 03 522 A1.

According to DE 195 03 522 A1, the hydrotalcites or hydrotalcite-like compounds are formed by hydrolysis of metal alkoxides by means of water and subsequent drying of the hydrolysis products obtained as precipitate. The metal alkoxides are formed by reaction of monovalent, divalent and/or trivalent alcohols with one or more divalent metals and/or one or more trivalent metals. The water used for the hydrolysis preferably comprises water-soluble anions selected from the group consisting of hydroxide anions, organic anions, in particular alkoxides, alkyl ether sulfates, aryl ether sulfates and glycol ether sulfates and inorganic anions, in particular carbonate, hydrogencarbonate, chloride, nitrate, sulfate and/or polyoxymetalate anions. Ammonium is preferably used as counterion.

As hydrotalcite-comprising materials which are particularly suitable as starting materials for producing the catalyst and have been prepared by hydrolysis of metal alkoxides, mention may be made of materials which can be procured from Sasol under the trade names Pural MG5, Pural MG20, Pural MG30, Pural MG50 and Pural MG70. According to the information provided by the manufacturer, the numerical value in the product names is the percentage by weight of MgO present in the product. To obtain a total weight of 100%, the proportion by weight of $Al_2O_3$ has to be added to the proportion by weight of MgO. It should be noted that the figures here are based on the oxides, although the samples also comprise hydroxide groups and water. It is also possible to procure materials which have other MgO to $Al_2O_3$ ratios. Particularly in those products or materials which have low magnesium contents, it is possible for these to comprise not only magnesium-aluminum-comprising hydrotalcite but also proportions of finely divided aluminum hydroxide or oxide hydrate.

A particularly preferred hydrotalcite-comprising starting material, viz. Pural MG30, comprises, for example, a mixture of hydrotalcite (i.e. a component having the composition $Mg_6Al_2(OH)_{18}*4H_2$ or $MgAl_2(OH)_{16}CO_3*4H_2O$) and boehmite, with the mixture having an overall $Al_2O_3/MgO$ ratio close to seventy to thirty % by weight. This number in the trade name of the product used here relates to the calcite material and means that in this particularly preferred example, the starting material has a boehmite content of about 55% by weight.

Instead of hydrotalcite, which is particularly preferred as constituent of the starting material in the production process of the invention, it is also possible to use other metal hydroxides or hydroxycarbonates as starting materials. Particular preference is given to those which can be produced by the same synthesis process as hydrotalcites and hydrotalcite-like compounds.

It is also important for the purposes of the invention for the hydrotalcite-comprising starting material to have a preferred Al/Mg ratio. In a description of the composition of the hydrotalcite-comprising starting material in terms of the oxides comprised therein (in ignited form), the preferred alumina/magnesia ratio (i.e. the $Al_2O_3$/MgO ratio) is in the range from 0.5 to 20 on a weight basis, with an alumina/magnesia ratio of from 1 to 10 on a weight basis being more preferred.

The preferred Al/Mg ratio is in the range from 1.5 to 2.5 on a molar basis, with an Al/Mg ratio of from 1.7 to 2.3 on a molar basis being more preferred. The preferred hydrotalcite-comprising starting material should preferably be able to be converted in significant proportions or virtually completely into a material having spinel or spinel-related structures or phase mixtures of such structures by high-temperature calcination at temperatures above 500° C.

Another important aspect of the invention is very intimate mixing of the hydrotalcite-comprising starting material with the fusible metal salt which gives close contact between the nickel species and the support precursor component and leads to unexpectedly good stabilization of the nickel species. After calcination, this leads, as mentioned above, to a mixed oxide phase having the composition $Ni_xMg_{(1-x)}O$ where x=0.3-0.7, preferably 0.4-0.6. (The molar range of x=0.3-0.7 corresponds to an NiO content of about 44-81% by weight and in the case of x=0.4-0.6 the NiO content is about 55-73.5% by weight.) Furthermore, a certain proportion of Ni spinel could be detected by means of XRD analyses after calcination.

The XRD results indicate that depletion of Mg species occurs in the mixed oxide phase $Ni_xMg_{(1-x)}O$. The Mg species replace Ni species in the Ni spinel. A possible explanation, which does not constitute a restriction of the invention, would be that a proportion of the aluminum continues to be present as aluminum oxide hydrate even at high temperatures. Under reductive conditions at high temperatures, elimination of metallic nickel from the mixed oxide phase $Ni_xMg_{(1-x)}O$ could occur, with the magnesium liberated then reacting with the aluminum oxide hydrate to form magnesium-aluminum spinel.

As regards the molar ratio of metal species in the hydrotalcite-comprising starting material $M_{HT}$ and metal species in the salt melt $M_S$, it can be stated that the molar ratio of metals $M_{HT}/M_S$ is always greater than 1. The molar ratio $M_{HT}/M_S$ is preferably in the range from 15 to 1.5 and more preferably in the range from 10 to 3. The use of a preferred ratio is important to ensure the conditions for good mixing of the components and homogeneous coating of the hydrotalcite and thus ensure the nanostructuring, in particular the high dispersion and finely divided nature of the nickel and the finely divided nature of the Mg spinel, of the material according to the invention.

The process steps are discussed in detail in WO 2013/068905. In one embodiment which is particularly preferred, the catalyst comprises at least the three phases nickel-magnesium mixed oxide, magnesium spinel and aluminum oxide hydroxide and in which the nickel-magnesium mixed oxide has an average crystallite size of ≤100 nm, preferably ≤70 nm, more preferably ≤40 nm, and the magnesium spinel phase has an average crystallite size of ≤100 nm, preferably ≤70 nm, more preferably ≤40 nm, the proportion of nickel is in the range 7-28 mol %, that of magnesium is in the range 8-26 mol %, that of aluminum is in the range 50-70 mol % and the BET surface area is in the range 10-200 $m^2$/g.

Particular preference is also given to an embodiment of the catalyst of the invention which has a proportion of nickel in the range 6-30 mol % and a proportion of magnesium in the range 8-38 mol %, preferably in the range from 23-35 mol %. The proportion of aluminum is preferably in the range 50-70 mol %.

It should be emphasized that particularly high-performance catalysts and thus particularly preferred embodiments of the invention are obtained when the physicochemical properties of the catalysts have particular values.

In a preferred embodiment, the physicochemical properties of the catalyst of the invention selected from the group consisting of phase composition according to XRD, BET surface area, pore structure, average pore diameter and/or tamped density have preferred values.

The phase composition of a particularly preferred catalyst is distinguished by the intensity of the diffraction reflection at 43.15±0.15°2θ (2 theta) (d=2.09±0.01 Å) being less than or equal to the intensity of the diffraction reflection at 44.83±0.20°2θ (d=2.02±0.01 Å), with the intensity of the diffraction reflection at 43.15±0.15°2θ (2 theta) (d=2.09±0.01 Å) more preferably being less than the intensity of the reflection at 44.83±0.20°2θ (d=2.02±0.01 Å) and the intensity ratio of the two diffraction reflections $I_{(43.15°)}/I_{(44.83°)}$ even more preferably being from 0.3 bis 1.0, preferably from 0.5 to 0.99, more preferably from 0.6 to 0.97 and particularly preferably 0.7 to 0.92.

A particularly preferred embodiment of the catalyst has a BET surface area in the range from 2 to 500 $m^2$/g, preferably from 5 to 150 $m^2$/g, more preferably from 5 to 100 $m^2$/g, even more preferably from 5 to 80 $m^2$/g, very particularly preferably from 5 to 78 $m^2$/g and in particular from 5 to 76 $m^2$/g. The determination of the specific surface area by the BET method was carried out in accordance with DIN 66131.

In addition, a preferred embodiment of the catalyst also has a characteristic tamped density which is preferably <1500 g/l, more preferably <1350 g/l and even more preferably <1100 g/l. The determination of the characteristic tamped density was carried out by means of a tamping volumeter STAV 2003 from JEL. A 0.5-1.0 mm crushed material fraction of the catalyst was used for the measurement.

A further description of catalyst A can be found in WO 2013/068905.

Catalyst B:

The hexaaluminate-comprising catalyst of the invention comprises cobalt and at least one further element from the group consisting of Ba, Sr, La, where the Co content is in the range 2-15 mol %, preferably 3-10 mol % and more preferably in the range 4-8 mol %, the content of the at least one further element from the group consisting of Ba, Sr, La is in the range 2-25 mol %, preferably 3-15 mol %, more preferably 4-10 mol %, and the content of Al is in the range 70-90 mol %.

On the basis of the ranges for the molar proportions indicated here, the following molar ratios for the metal ion species can be determined: the molar ratio of Co to Al (i.e. the $n_{Co}/n_{Al}$ ratio) is in the range 0.03-0.17, preferably 0.043-0.11 and more preferably 0.057-0.08. The molar ratio of $M^{BaSrLa}$ to Al (i.e. the $n_{MBaSrLa}/n_{Al}$ ratio) is in the range 0.029-0.28, preferably 0.043-0.17 and more preferably in the range 0.057-0.11. The molar ratio of Co to $M^{BaSrLa}$ (i.e. The $n_{Co}/n_{MBaSrLa}$ ratio) lies in the range 1.0-0.6, preferably 1.0-0.67 and more preferably 1.0-0.8.

In addition, particular preference is given to the molar ratios of the elements comprised in the catalyst to be in the following ranges: the ratio of cobalt to aluminum (i.e. the $n_{Co}/n_{Al}$ ratio) is in the range from 0.05 to 0.09 and particularly preferably in the range from 0.06 to 0.08. In a preferred embodiment of the catalyst of the invention, the molar ratio of $M^{BaSrLa}$ to aluminum (i.e. the $n_{MBaSrLa}/n_{Al}$ ratio) is in the range from 0.09 to 0.25, particularly preferably in the range from 0.092 to 0.20. Furthermore, the molar ratio of Co to $M^{BaSrLa}$ (i.e. the $n_{Co}/n_{MBaSrLa}$ ratio) is preferably in the range from 1.0 to 0.3 and particularly preferably in the range from 0.85 to 0.40.

A material which consists entirely of cobalt hexaaluminate and comprises at least one element from the group consisting of Ba, Sr, La can be described by the empirical formula $CoM^{BaSrLa}Al_{11}O_{19}$. In this case, the metallic species have the following stoichiometric ratios: the molar ratio of Co to Al (i.e. the $n_{Co}/n_{Al}$ ratio) is 1, the molar ratio of $M^{BaSrLa}$ to Al (i.e. the $n_{MBaSrLa}/n_{Al}$ ratio) is 0.091 and the molar ratio of Co to $M^{BaSrLa}$ (i.e. the $n_{Co}/n_{MBaSrLa}$ ratio) is 1.

Comparison of the composition of the catalyst of the invention with a material which consists entirely of cobalt hexaaluminate phase indicates that the catalyst of the invention (preferably) has a lower proportion of cobalt (relative to aluminum) and a higher proportion of cationic species from the group consisting of Ba, Sr, La (relative to cobalt) compared to the pure-phase cobalt hexaaluminate. Based on the pure-phase cobalt hexaaluminate, this means that the catalyst of the invention has a substoichiometric amount of cobalt and a superstoichiometric amount of cationic species from the group consisting of Ba, Sr, La.

An explanation of the formation of the catalyst of the invention is that the cobalt-comprising species added to the synthesis system are virtually completely or completely incorporated into the structure of the cobalt hexaaluminate phase and cobalt is no longer available for the formation of the secondary phase. The formation of the secondary phase proceeds from the aluminum-comprising species and the cationic species from the group consisting of Ba, Sr, La used in each case, which leads to aluminates or perovskites (e.g. $SrA_2O_4$, $LaAlO_3$ etc.) or other phases of the elements La, Sr, Ba, Al known to those skilled in the art being predominantly formed as secondary phase. It follows therefrom that the proportion of free aluminum oxide and the associated number of Lewis acid sites can be minimized. However, the explanation given above is not intended to restrict the invention in any way.

In a preferred embodiment, the catalyst of the invention comprises secondary phases or a secondary phase, where the total proportion of the secondary phases is in the range 0-50% by weight, preferably in the range 3-40% by weight and more preferably in the range 5-30% by weight. The secondary phase preferably comprises oxides, and these are more preferably from the group consisting of alpha-aluminum oxide, theta-aluminum oxide, $LaAlO_3$, $BaAl_2O_4$, $SrA_2O_4$, $CoAl_2O_4$, La-stabilized aluminum oxide and/or La-stabilized aluminum oxide hydroxide.

In a preferred embodiment, the catalyst comprises at least one noble metal-comprising promoter from the group consisting of Pt, Rh, Pd, Ir, where the proportion of noble metal-comprising promoters is in the range 0.1-3 mol %.

In a further embodiment, the catalyst also comprises a proportion of further cations which are preferably selected from the group consisting of Mg, Ca, Ga, Be, Ni, Fe, Cr, Mn, with Mg being particularly preferred.

It is also conceivable that, as alternatives to the at least one element from the group consisting of Ba, Sr, La, a further element or plurality of elements from the group of the lanthanides can be present in the catalyst of the invention. It is also not to be ruled out that the performance properties of the catalyst of the invention can be improved further by the incorporation of specific secondary phases or a combination of secondary phases within the catalyst.

The hexaaluminate-comprising catalyst can be prepared by means of the following steps:
(i) producing of an aluminum source, preferably a finely divided aluminum oxide and/or hydroxide modification,
(ii) contacting of the finely divided aluminum source with a fusible or soluble cobalt-comprising compound and at least one further soluble or fusible metal salt,
(iii) intimate mixing of the aluminum source and the dissolved or molten metal salts,
(iv) drying of the mixture,
(v) low-temperature calcination of the mixture,
(vi) molding or shaping,
(vii) high-temperature calcination of the mixture.

The at least one further soluble or fusible metal salt comprises a metal salt which is selected from the group consisting of barium, strontium and lanthanum.

In a preferred embodiment, the further soluble metal salt comprises at least two metal salts, in which at least barium-comprising species are present in combination with strontium-comprising species or at least barium-comprising species are present in combination with lanthanum-comprising species or strontium-comprising species are present in combination with lanthanum-comprising species.

When the metal salts are not present in the form of the melt but in the form of the dissolved metal salts during mixing in step (iii), a solvent is also added to the metal salts if these have not been used in the dissolved state.

In a particularly preferred embodiment, the aluminum source is selected from the group consisting of high reactive aluminum oxides and aluminum hydroxides. The aluminum source preferably comprises dispersible primary particles, with a primary particle size of less than or equal to 500 nm being preferred.

Hexaaluminate-comprising catalyst/hexaaluminate phase

For the purposes of the present disclosure, the term hexaaluminate-comprising catalyst comprises materials which have a high proportion of hexaaluminate phase. This means that the hexaaluminate-comprising catalyst can, in particular embodiments, also comprise a certain proportion of secondary phases. The term hexaaluminate phase comprises phases which have a sheet structure similar to or the same as the types of magnetoplumbite structure and/or the beta-aluminate structure, e.g. beta'- or beta"-aluminate structure. If the catalyst comprises secondary phases, the proportion of secondary phase is in the range 0-50% by weight, preferably in the range 3-40% by weight and more preferably in the range 5-30% by weight.

The proportion of hexaaluminate-comprising phase can be determined by diffractometric methods, for example the Rietfeld refinement. If particularly finely divided or nanocrystalline materials are present, the proportion of hexaaluminate phase is determined by means of an optic analysis by the Kubelka-Munk method. Here, a highly sintered reference sample having the same stoichiometry as the sample to be measured (in respect of the proportion of crystalline phase) is prepared and this is then designated as standard sample. The samples to be measured are compared to the standard sample as reference, with the reference having been assigned a value of one hundred percent beforehand. The optical analysis method is preferred in the case of nanocrystalline material when these have very small crystallites having a short coherence length. Short coherence lengths are present, (in the case of diffractometric studies using an X-ray wavelength of 0.154 nm), particularly when the crystallite sizes are less than 0.5 nm, preferably less than 0.4 nm and more preferably less than 0.3 nm. Such nanocrystalline materials can be provided such that they appear as X-ray-amorphous in powder diffraction and as crystalline in the UV analysis.

Aluminum Source

As aluminum source, it is in principle possible to use all aluminum-comprising starting materials, and a preferred aluminum source is selected from the group consisting of: pseudoboehmite, boehmite, gibbsite, bayerites, gamma-aluminum oxide, theta-aluminum oxide, hydrotalcites such as magnesium hydrotalcite, colloidal basic aluminum oxides and other colloidal aluminum sources known to those skilled in the art and also mixtures of these. Included are, in particular, the following products, inter alia, from Sasol: Disperal and all Disperal types, Dispal, Pural, Puralox, Catalox, Catapal and also all Pural MG types.

Without restricting the process of the invention by a theory, it is assumed that the surface structure of the highly reactive aluminum oxide or aluminum hydroxide source, for example theta-aluminum oxide, gamma-aluminum oxide, pseudoboehmite, boehmite, gibbsite, bayerite and mixtures of the abovementioned and other highly reactive aluminum oxide or aluminum hydroxide sources could have a substantial influence on the formation of an active catalyst. The boehmite used preferably comprises dispersible particles, with the primary particle size preferably being in the range of less than or equal to 500 nm. The term "dispersible particles" means that the particles dispersed or slurried in water form a stable dispersion and precipitate only after a long time.

The aluminum source is preferably a nanoparticulate aluminum-comprising starting material or colloidal primary particles. As nanoparticulate aluminum-comprising starting materials, it is possible to use, for example, peptized aluminum hydroxides, aluminum oxide hydrates or aluminum oxides. The peptization can be carried out by means of organic acids, for example acetic acid, propionic acid, or by means of inorganic acids, for example nitric acid or hydrochloric acid. The colloidal particles can be admixed with stabilizers such as surfactants, soluble polymers or salts, or such stabilizers can be used in the production process. The colloidal primary particles can also comprise partially hydrolyzed alkoxides.

In a specific embodiment, it is also possible to use shaped bodies of the abovementioned aluminum oxide sources, which are then brought into contact with the metal compounds. Examples of such shaped bodies are, inter alia, pellets, extrudates or granulated material or other shaped bodies known to those skilled in the art.

The use of a highly reactive aluminum oxide or aluminum hydroxide source is particularly advantageous because it aids the formation of desired phases.

As metal compounds, preference is given to using any compounds which are soluble in solvents or can be melted in the temperature range up to 250° C. and are available industrially at low cost. Preferred solvents include, inter alia, the following: water, acidic or alkaline aqueous solutions, alcohols such as methanol, ethanol, propanol, isopropanol, butanol, ketones such as acetone or methyl ethyl ketone, aromatic solvents such as toluene or xylenes, aliphatic solvents such as cyclohexane or n-hexane, ethers and polyethers such as tetrahydrofuran, diethyl ether or diglyme, esters such as methyl acetate or ethyl acetate.

Furthermore, particular preference is given to using soluble salts, complexes or metal-organic compounds as metal compounds. Examples of salts are, inter alia, nitrates, nitrites, carbonates, halides, acetates, octanoates. Examples of complexes are, inter alia, EDTA complexes, complexes with amino acid or amines, complexes with polyols or polyacids, complexes with phosphanes. Examples of metal-organic compounds are, inter alia, acetylacetonates, alkoxides, alkyl compounds, compounds with aromatics, e.g. cyclopentadienyl adducts.

As fusible metal compounds, preference is given to using metal salts which do not decompose during melting or in the case of which the decomposition is greatly kinetically inhibited. Examples of such metal salts are, inter alia, nitrates, nitrites, halides, chlorates, bromates, iodates, sulfates, sulfites. Particular preference is given to nitrates, nitrites or salt melts comprising nitrates and nitrites.

Suitable metals of contacting the metal compounds with the aluminum source are, inter alia, impregnation methods in which the metal compounds are dissolved in suitable solvents which are subsequently removed by drying. Such a drying step can, in the case of a pulverulent aluminum source, be carried out, for example, by freeze drying or spray drying; as an alternative, spray granulation or pure static drying of the composites formed can be carried out. For the purposes of the invention, impregnation is a particularly preferred method.

Further suitable methods of contacting are, inter alia, kneading or milling of the aluminum source in the presence of the metal compounds with or without addition of liquids. Kneading in particular is, for the purposes of the invention, a preferred method since it allows coupling with subsequent extrusion and can thus be advantageous for shaping.

For the purposes of the invention, preference is given, in particular, to metal salts which aid formation of the hexaaluminate phase in the presence of cobalt.

Such salts are, inter alia, lanthanum, barium and strontium. Lanthanum, barium and strontium are incorporated as interlayer cations. According to the invention, the use of one or more of these cations is included. This can form both materials which incorporate various cations in the interlayer plane (mixed crystal formation, i.e. single crystallites which incorporate both strontium and barium in the interlayer planes, for example) and also those which in each case form only crystallites having one type of cation species in the interlayer plane but are then present as a mixture of crystallites having different types of cation species (i.e., for example, a crystal mixture of crystallites having only barium as interlayer cations with crystallites having only strontium as interlayer cations). According to the invention, both types of mixture (i.e. mixed crystals and crystal mixture) are included.

Further cations which are preferred for the purposes of the invention are those which like cobalt are incorporated in the spinel blocks. Preference is, inter alia, given to magnesium, calcium, gallium, beryllium, nickel, iron, chromium, manganese. Particular preference is given to magnesium.

It has, completely surprisingly, been found that carrying out the high-temperature calcination at relatively low temperatures in the temperature range from 800° C. to 1300° C., preferably in the temperature range from 850° C. to 1200° C., particularly preferably in the temperature range from 900° C. to 1200° C., also leads to catalysts which have very good catalytic performance properties in respect of the process of the invention for producing synthesis gas.

Further process steps are disclosed in detail in WO 2013/1180789.

The robocasting technique implies the extruding through one or more nozzles preferably having a maximum diameter of less than 5 mm, more preferably of less than 1 mm, most preferably 0.8 mm or less. Specifically, the diameter of the nozzle should be in the range of from 0.05 mm to 1.0 mm, more preferably from 0.2 mm to 0.9 mm, most preferably from 0.5 to 0.8 mm. The nozzle can have any desired cross-section, e.g. circular, elliptical, square, star-shaped, lobbed. The maximum diameter is the largest diameter of a non-circular cross-section.

The (maximum) fiber diameter in the monolith is preferably 0.2 to 0.9 mm, more preferably 0.4 to 0.8 mm, most preferably 0.5 to 0.8 mm, specifically 0.6 to 0.8 mm. This preferably corresponds with a crushing strength of the monolith of at least 100 N, more preferably at least 300 N, most preferably at least 400 N, specifically at least 500 N.

One of the main criteria for microextruding is the use of an extrudable paste that has the correct rheological properties for the microextruding technique. The mentioned literature gives detailed advice as how to obtain the required rheological properties.

If necessary, in the process according to the present invention, a viscosity adjusting agent can be employed. Typical viscosity adjusting agents are celluloses like carboxymethyl cellulose. Preferably, no viscosity adjusting agent or polymer is employed.

In this respect, average particle sizes can be measured by sieving the particles or by photographic techniques like camsizer techniques. The average particle size refers to the arithmetic or number average particle size.

The suspension paste prepared in step a) of the process according to the present invention preferably has a solids content of 1 to 95 wt %, more preferably 10 to 65 wt %.

If necessary, a binder material for binding the particles together can be employed in the suspension paste. Preferred binder materials are selected from the group of organic or inorganic binders such as clays, alumina, silica or mixtures thereof.

The amount of binder material in the suspension paste is preferably in the range of from 0.1 to 80 wt %, more preferably 1 to 15 wt %, based on the suspension paste.

Often, it is not necessary to additionally use organic binder materials in the suspension although their use is possible according to the invention. Therefore, preferably no organic binder material is present in the suspension.

The term "porous" employed here defines that the monolith is not a solid block of material but contains channels or pores. By stacking spatially separated catalyst fiber layers in an ABA or ABACA, also referred to as ABC, manner, through-channels or pores can be formed. Thereby, pathways with direct line-of-sight or pathways with no direct line-of-sight can be formed.

The porosity is preferably at least 20%, more preferably at least 30% can preferably be in the range of from 20 to 90%, and can be determined by Hg-PV and He-density. It can be determined by the following formula. Porosity (%)=100−[(density of total microextruded structure/density of fiber material)×100]. The density of the total microextruded structure is determined by dividing its total weight by its total volume. The density of the fiber material can be determined by measuring Hg-PV and He-density.

Since the lattices or scaffolds formed from the fibers are self-supporting, open space remains between the fibers which leads to the porosity. Respective structures can be seen in the abovementioned literature. They show a low pressure drop when employed in a reactor.

The robocasting process employed according to the present invention can also be described as 3D fiber deposition.

General Description of 3DFD

3D Fiber Deposition (3DFD) is used to shape the powder. The 3DFD method is an adaptive manufacturing method whereby a highly loaded paste is extruded by a moving nozzle. By computer controlling the movement of the extrusion head in x, y and z-direction, a porous material can be produced from the extruded fibers or strands layer by layer. After drying, the porous material can be thermally dried.

The main benefit of this technology is the degree of freedom with regard to the porous parameters (fiber thickness, interfiber distance and stacking design).

The typical flow chart for the 3DFD technology consists of the following subsequent steps:

Prepare highly viscous ceramic (or metallic) paste

Extrude through thin nozzle

Computer controlled deposition of fibers to form a ceramic (or metallic) porous periodic structure Drying and if necessary reducing The first important step is to make sure that no large particles are present in the paste. Therefore the particle size of the starting material is checked. If too large particles are present the powder is sieved to obtain the desired particle size. As a rule of thumb, the largest particle (represented by the d99 value) should preferably be at least five times smaller than the nozzle size that will be used, more preferably at least ten times smaller.

In the following step the powder is mixed together with the solvent/diluent (e.g. water), if necessary binder and additives, thus obtaining a viscous paste. A good mixing to achieve a homogenous paste (minimizing agglomerates or the incorporation of air bubbles) is a prerequisite for a smooth and reproducible process. The powder loading of the functional material depends on the specific surface area, the particle size distribution and the powder morphology. Generally, as the particle size of the powder decreases, the viscosity of the paste will increase. Therefore the solid loading needs to be lowered for these powders. Apart from organic or, preferably, inorganic binder(s), rheology modifiers can be added to control the rheological behavior of the paste. In some cases a defoamer is also added to avoid air bubbles in the paste.

After mixing and de-airing, the paste is transferred to the paste reservoir and mounted on the 3DFD set-up. The nozzle, preferably either plastic or metal (below 200 µm), is attached to the paste reservoir. Paste extrusion is achieved e.g. by a displacement pump or a screw pump. During deposition, it might be necessary to control the drying conditions.

After drying at room conditions (or under controlled atmosphere and temperature), the 3DFD structure is reduced, if necessary.

Experimental Procedure of 3DFD Process

Obtaining a smooth process and a narrow control on the extrusion of thin filaments often requires adjustments of both the formulation of the paste and the experimental set-up. The main process parameters which have to be addressed are listed below.

Parameters

Particle size distribution of starting material

Preparation and mixing procedure of the paste

Paste formulation

De-airing & paste reservoir filling

Design of deposition platform

Height control of nozzle
Programming of turns and transition between layers
Tuning extrusion speed versus movement speed
Drying conditions during deposition For a further description of the process, reference can be made to the mentioned documents.

Figure 2:
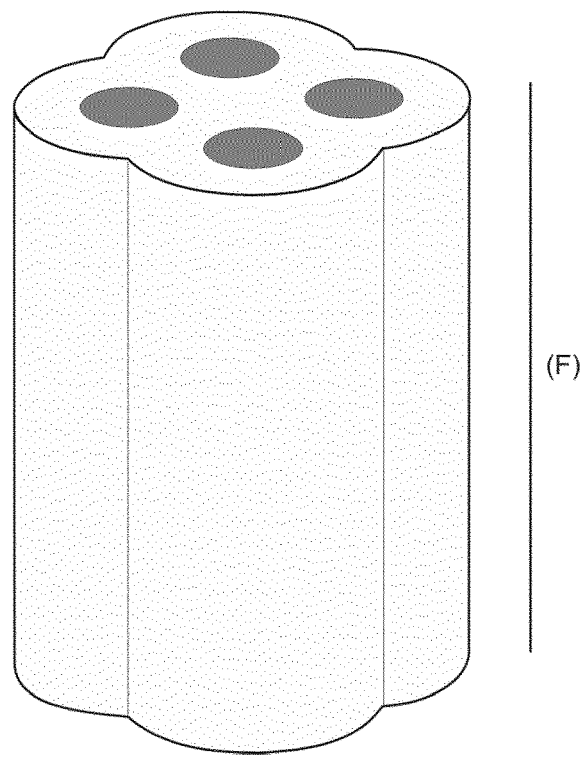

The stacking design is preferably as depicted in FIGS. 1 and 2 of U.S. Pat. No. 7,527,671. Most preferred is a 1-3-1 pattern.

The liquid diluent employed can be chosen from water and organic liquid diluents. Preferably, the liquid diluent contains mainly or is water.

The drying is preferably performed at a temperature in the range of from −100 to 1000° C., more preferably 0 to 300° C., most preferably 20 to 110° C.

The monolith of stacked catalyst fibers is preferably three-dimensionally structured by depositing the extruded fibers in regular, recurring stacking pattern (periodically structured catalyst), to form a three-dimensionally structured porous catalyst monolith precursor.

The monolith can be formed from one continuous extruded fiber or from multiple individual extruded fibers.

Preferably, the regular, recurring stacking pattern is composed of stacked layers of extruded fibers, wherein in each layer at least 50 wt %, more preferably at least 90 wt % of the extruded fibers or each of the fibers are deposited parallel to each other and spatially separated from each other. The parallel deposition can be in straight or curved lines. As an alternative, they can be deposited/stacked in a circular pattern with radial interlayers, like in a cobweb pattern.

More preferably, at least 50 wt %, most preferably at least 90 wt % of the extruded fibers or each of the fibers are deposited as linear strands parallel to each other and spatially separated from each other, wherein the direction of the strands in each layer is different from the direction in neighboring layers, so that a porous structure with contact points of strands of neighboring stacks result. As an alternative, multiple cobweb pattern can be stacked, each pattern layer preferably rotated relative to its neighboring pattern layers.

One example of stacks of layers alternating by 90° in the direction is depicted in FIGS. 1 and 2 of U.S. Pat. No. 7,527,671.

The fibers or strands preferably have a thickness of 10 to 5000 μm, more preferably 10 to 1000 μm, most preferably 150 to 500 μm.

They are preferably spatially separated from each other by 10 to 5000 μm, more preferably 100 to 1000 μm, most preferably 200 to 800 μm.

One example is a stacking of 360 μm strands being spaced by 650 μm.

Typical monolith sizes are 1 cm$^3$ to 100000 m$^3$, more preferably 3 to 300000 cm$^3$.

The monolith can have any desired shape. Preferably, it is in the form of a cylinder with circular or ellipsoidal cross section, a cuboid, a sphere, an ellipsoid, a tablet or a polygon. Also mixed geometric shapes, like combinations of cylinder and cuboid or stacked cubes, are possible.

In comparison to this, standard extrusion processes for catalyst extrudates that are made on a regular basis have a minimum diameter of 1.2 mm. Depending on the formulation, these extrudates have a strength of 50 N or lower as measured by the SCS method (side crush strength).

The crushing strength in the stacking direction (frontal crushing strength) of the catalyst monolith, preferably with dimensions 1.5 cm×1.5 cm×1.2 cm (x,y,z axis, z being the stacking direction), according to the present invention is preferably at least 60 N, more preferably at least 100 N, most preferably at least 150 N or at least 300 N, specifically at least 400 N, more specifically at least 500 N when xy opposite planar sides are pressed.

The determination of the crushing strength is for examples disclosed in Oil & Gas Science and Technology—Rev. IFP, Vol. 55 (2000), No. 1, pp. 67-85, specifically section 3.1.1. An example for the determination of the (side) crushing strength (SCS) is as follows: This method covers the resistance of a formed catalyst microstructure to a compressive force. The microstructure is subjected to a compressive load between jaws. The force required to crush the tablet is measured and recorded in Newton force. The operation is executed using the semi-automatic Schleuniger Model 6D hardness tester. The microstructure is tested with the XY plane facing upright between the measure jaws. Press the "START"-button on the Schleuniger 6D. The jaws will slowly approach each other to execute the crushing test. The crushing strength is displayed on the Schleuniger and the computer monitor.

The maximum crushing strength depends on the materials used for preparing the catalyst monolith and also on the three-dimensional structure of the catalyst monolith as well as the fiber diameter. The more contact points between the individual fiber layers are present, the higher the crushing strength will be. Preferably, adjacent layers have at least 10 contact points, more preferably at least 20 contact points, most preferably at least 30 contact points to one neighboring layer. Thus, for a fiber layer, which has two neighboring layers, the number of contact points is twice the number stated above. Due to the contact points, the stack of fiber layers is self-supporting.

There is no upper limit for the crushing strength of the catalyst monolith. Typically, the maximum crushing strength is 100,000 N and often it is 10,000 N. Thus, the crushing strength of the catalyst monolith according to the present invention is preferably in the range of from 60 to 100,000 N, more preferably 100 to 100,000 N and most preferably 300 to 100,000 N, specifically 400 to 100,000 N, more specifically 500 to 100,000 N. According to one embodiment of the invention, the upper limit is 10,000 N.

The maximum can also be the maximum that a machine for measuring crushing strength is able to measure. The maximum can depend on the size of the monolith. If the monolith is larger than the machine for measuring it allows, the monolith is cut to a suitable size, preferably 1.5 cm×1.5 cm×1.2 cm (xyz axis).

Thus, the process according to the present invention leads to catalyst structures having a high strength combined with a high surface area/porosity.

The invention also relates to a three-dimensional porous catalyst monolith of stacked catalyst fibers, obtainable by the above process.

The invention furthermore relates to the use of these monoliths as catalysts in the reforming of hydrocarbons in the presence of $CO_2$, in water-gas shift reactions and reverse water-gas shift reactions.

In general, the methane reforming is carried out in a continuous process in which the catalyst has been introduced into a tube reactor. In this context, it is advantageous for the reduction step to be carried out in the same tube reactor in which the catalyst is used for carrying out the reforming.

The reforming is carried out at a temperature in the range from 500° C. to 1100° C. and pressures of from 2 to 70 bar. The pressures when carrying out the process are preferably in the range from 5 to 70 bar, more preferably in the range from 10 to 40 bar and even more preferably in the range from 20 to 40 bar. In an advantageous embodiment of the reforming process, the catalyst is subjected to conditioning. The conditioning is a defined start-up procedure by means of which the catalyst is preactivated. The catalyst material forms a nanostructure by means of which sintering of the active metal and deposition of carbonaceous material on the catalyst can be suppressed or ruled out.

An important aspect of the invention also concerns a high-pressure process (p≥20 bar) for reaction of a feed gas which has a very high $CO_2$ content and simultaneously has a small proportion of water vapor. It should also be emphasized here that it is surprising and unexpected that such a mode of operation is possible and does not lead to carbonaceous deposits on the catalyst. The small amounts of water vapor enable the process economics to be improved very substantially, which is particularly unexpected for the nickel-comprising catalysts. In addition, the result is a product stream which has an advantageous stoichiometric composition in respect of the molar ratio of hydrogen to CO of $H_2/CO \leq 2.0$, which is otherwise achieved only by means of autothermal reforming and partial oxidation.

During conditioning, the catalyst of the invention is firstly exposed to a methane-comprising gas stream which has a high proportion of water vapor and/or hydrogen. Here, the catalyst is heated to a temperature of 700° C.

In a subsequent step, $CO_2$ is added to the feed gas stream and hydrogen is subsequently added, with the introduction of water vapor at the same time being firstly reduced and subsequently stopped.

The feed fluid stream comprises the compounds which are necessary for the desired process, namely $CH_4$, $CO_2$ and $H_2$ and also $H_2O$.

The temperature of the catalyst can be increased from the conditioning temperature to the process temperature. The process temperature is preferably in the range from 700° C. to 1100° C. An upper limit to the process temperature is imposed by the heat resistance of the steel reactors used for the process. The upper limit to the process temperature is preferably in the range from 950° C. to 980° C.

An advantageous composition of the feed fluid for the preactivation comprises from 30% to 45% of each of methane and $CO_2$ and also from 5 to 40% of $H_2$ and 5-15% of $H_2O$. In addition, the feed fluid can also comprise further components, for example argon gas which functions as internal standard.

In a particularly advantageous embodiment of the process of the invention, the composition of the feed fluid for preactivation of the catalyst comprises from 25% to 50% of each of methane and/or $CO_2$ and from 5 to 50% of $H_2O$ and/or 5-40% of $H_2$. In addition, the feed fluid can also have further components, for example argon which functions as internal standard.

The catalyst of the invention has a high efficiency for the reaction of $CH_4$ and $CO_2$. A product stream which has an advantageous stoichiometric composition in respect of the molar ratio of hydrogen to CO is obtained. An $H_2/CO$ ratio of less than 3, particularly preferably less than 1.5, in particular less than 1.2, is considered to be advantageous.

In a preferred mode of operation of the reforming process of the invention, the molar $CO_2/CH_4$ ratio is in the range from 0 to 1.5, preferably in the range from 0.3 to 1.4, more preferably from 0.5 to 1.3 and more preferably from 0.7 to 1.2.

In addition, preference is also given to a mode of operation of the reforming process of the invention in which the molar $H_2/CH_4$ ratio is ≤3.0, more preferably ≤0.9 to 2.7. In principle, carrying out the process of the invention in a mode of operation in which the amount of water vapor is reduced further or the addition of water vapor can be omitted entirely is not completely ruled out.

The process of the invention for producing synthesis gas is operated at a GHSV in a range from 500 to 50 000 $h^{-1}$, preferably in a range from 1000 to 15 000 $h^{-1}$ and in particular in a range from 1000 to 5000 $h^{-1}$.

In a further aspect of the invention, it is also possible to achieve, by means of the process of the invention using the catalyst of the invention, an operating state in which the catalytic high-pressure process can be operated in respect of the methane conversion close to the thermodynamic equilibrium, with the methane conversion preferably being at least 50% of the methane conversion at thermodynamic equilibrium, more preferably at least 85% of the methane conversion at thermodynamic equilibrium and in particular 90% of the methane conversion at thermodynamic equilibrium.

The invention furthermore relates to a control system data set containing a plurality of control instructions which when implemented on an additive production facility prompt the additive production facility to produce a three-dimensional porous catalyst monolith or three-dimensional porous catalyst monolith precursor as described above.

Additive production facilities are for example 3D fiber deposition (3DFD), 3D printing, stereolitography, fused filament fabrication (FFF) or laser sintering. These facilities or equipments are used to shape the powder or paste in order to form the three-dimensional catalyst monolith or its precursor. Thus, the additive production facility can be a 3D fiber deposition printer, 3D printer, stereolitography device or laser sintering device. These production facilities or production equipments are typically computer-controlled using a CAD file (computer aided design file). The CAD file contains the information on the three-dimensional structure of the porous catalyst monolith or its precursor and is needed to operate the additive production facility.

This CAD file which can also be described as a control system data set contains a plurality of control instructions which drive the additive production facility, for example the moving nozzle in a 3D fiber deposition apparatus. The control system data set can also be described as control system data record or data drive set. The control system data set or CAD file contains all information necessary to drive the additive production facility in order to produce the monolith or monolith precursor. This meaning is encompassed by the term "prompt" as used above. The control system data set and control instructions are typically electronic data stored on appropriate data storing device which can be a CD, DVD, USB stick, hard drive or SSD drive of a computer or attached to a computer.

The control system data set is typically loaded to the computer controlling the additive production facility prior to printing or extruding the 3D structure. Thus, the term "implementing" typically means loading the control system data or control instructions in a computer system which operates the additive production facility. Thus, the additive production facility then has the control instructions implemented thereon.

The invention will be further illustrated by the following examples.

Example of 3D Microextruded Catalyst:
3D Microextruded Catalyst
Production Process The process of the invention for producing the catalyst is illustrated below with the aid of example E1. 261.7 g of pulverulent nickel nitrate hexahydrate $(Ni(NO_3)_2 \cdot 6H_2O$ from Merck) were placed in a glass beaker and melted at a temperature of about 100° C. by heating on a hotplate. 400 g of preheated hydrotalcite powder were subsequently introduced into the glass beaker in which the nitrate salt melt was present, with the nitrate salt melt being mixed by means of a mechanical stirrer on a hotplate during introduction of the hydrotalcite. The drive of the stirrer was arranged above the opening of the glass beaker. Pural MG30 from Sasol was used as hydrotalcite. Before introduction of the hydrotalcite, the latter had been heated for 30 minutes at 130° C. in a convection oven. The introduction of the hydrotalcite into the melt was carried out in a plurality of substeps and over a total period of 10 minutes. The glass beaker with the mixture of hydrotalcite and salt melt was heated at 130° C. in the oven for 30 minutes and subsequently mixed for about 5 minutes by means of a stirrer and for a further 2 minutes by means of an Ultra-Turrax stirrer.

The mixture of nitrate salt and hydrotalcite obtained here was cooled and divided into two parts of about 330 g which were then subjected to a low-temperature calcination in a rotary bulb furnace. For this purpose, the samples were introduced into a fused silica flask which was fastened in the rotary bulb furnace and was rotated at a speed of 12 revolutions per minute while passing an air stream of 1/min through it. The fused silica flask in which the sample mixture was present was heated stepwise via three different temperature stages of 120° C., 180° C. and 280° C. to a target temperature of 425° C. The residence time of the sample at the individual temperature stages of the heating phase and at the target temperature was in each case 2 hours. 2° C./minutes was used as heating rate.

The product obtained from the low-temperature calcination was mixed with (5% by weight of) lubricant and pressed to form pellets by means of a mechanical punch press (XP1 from Korsch) using a pressing force in the range from 30 to 35 kN.

As lubricant, it is possible to use, for example, graphite, stearic acid or magnesium stearate. The pellets obtained here had a diameter of 13 mm and a thickness of about 4-5 mm. The pellets were precomminuted by means of a rotary screen mill at a speed of rotation of 70 rpm and pressed through a sieve. The precomminuted material was subsequently sieved in order to separate off the target fraction having a particle size of from 0.5 to 500 µm. Sieving was carried out by means of a sieving machine from Retsch (Model AS 200) using a shaking frequency of 60 Hz.

The material obtained after sieving was subjected to a high-temperature calcination at 950° C. For this purpose, the sample material was heated in a muffle furnace to 950° C. at a heating rate of 5° C./minute while passing an air stream (of 6 l/min) through the furnace, heat treated at 950° C. for 4 hours and then cooled to room temperature.

A suspension was made from this catalyst precursor powder (nickel oxide nanoparticles on silica powder, obtained by precipitation), clay binder, and demi-water. The suspension was made by mixing the three components in the following mass percentages: 30.6% catalyst precursor, 4.4% organic binder, 65% demi-water. The ingredients were manually added and mixed by special mixing equipment (speedmixer) to obtain the right rheological properties for extruding through a e.g. 400 µm sized nozzle. The particle size of the powder was selected to allow for this extrusion. The suspension is brought in a dispensing unit consisting of a syringe vessel and a nozzle. The unit is mounted on a microextruder machine. The microextruder is a computer numerical control (CNC) machine that is programmed to move according to a well-defined pattern and within a well-defined form. The CNC machine is programmed to continuously deposit filaments layer by layer in a predefined pattern. Depending on the thickness of the filaments foreseen in the application, a nozzle with the right diaphragm opening will be chosen, e.g. between 0.1 and 2 mm. The deposition parameters, e.g. the distance between the nozzle and the surface of the structure, the speed of the nozzle movement, the air pressure and the temperature and airflow of the environment, etc. are regulated. A 3D-structure is built in a box by depositing the filaments layer by layer according to the programmed pattern and according to the required dimensions. The 3D structures were afterwards dried at 80° C. for 2 days at 95% relative humidity. The material obtained after sieving was subjected to a high-temperature calcination at 1100° C. after extruding. For this purpose, the sample material was heated in a muffle furnace to 1100° C. at a heating rate of 5° C./minute while passing an air stream through the furnace, and then cooled to room temperature.

The structures were tested on theirs crushing strengths.

Overview of the Examples

TABLE 1

| Example | Shape | Fiber diameter (mm) | Shape height (mm) | Shape width (mm) | Weight/piece (g) |
|---|---|---|---|---|---|
| C1 | tetralobe (Quattro) | not applicable | 13.6 | 12.4 | 2.5 |
| 1 | cubical | 0.4 | 21.1 | 20.1 | 5.4 |
| 2 | cubical | 0.6 | 20.5 | 20.1 | 5.0 |
| 3 | cubical | 0.8 | 23.7 | 23.4 | 9.8 |
| 4 | cylindrical | 0.6 | 14.6 | 19.2 (diameter) | 4.6 |

The tetralobe is a structure of 4 parallel and agglomerated tubes of catalyst material, thus leading to a structure having 4 parallel through-channels as shown in FIG. 2. The spacing between parallel stand in Examples 1 to 4 is provided in the Table 1. They are arranged in an ABAB manner.

Description of Catalytic Tests and Performances

Comparison of Properties of Individual Pieces

The table below shows that the micro-extruded pieces present a higher crushing strength than a comparable piece of a state-of-the-art geometry. This is a significant advantage for the commercial use of the hydrocarbon reforming catalyst, since in many cases the mechanical strength of the shaped body in a conventional geometry is either not high enough or cannot be guaranteed without considerable production effort (technical and economical).

Additionally, the table below also shows that the estimated piece density can be significantly lower depending on the geometry of the micro-extruded shaped body due to its high porosity. This is an important advantage for the catalyst manufacturer, because it is necessary to produce less catalyst mass to fill a reactor using the micro extrudates in comparison to the conventional geometry. These results in lower production costs for the catalyst manufacturer This is achieved without negative impact on the specific catalytic surface area.

TABLE 2

| Example | Shape | Fiber diameter (mm) | Inter-fiber distance (mm) | Crushing strength (N) | Density of piece** (g/ml) |
|---|---|---|---|---|---|
| C1 | tetralobe (Quattro) | not applicable | not applicable | 375 | 1.20 |

TABLE 2-continued

| Example | Shape | Fiber diameter (mm) | Inter-fiber distance (mm) | Crushing strength (N) | Density of piece** (g/ml) |
|---|---|---|---|---|---|
| 1 | cubical | 0.4 | 0.6 | 167 | 0.63 |
| 2 | cubical | 0.6 | 0.5 | >500* | 0.60 |
| 3 | cubical | 0.8 | 0.2 | >500* | 0.76 |
| 4 | cylindrical | 0.6 | 0.5 | >500* | 1.09 |

*above upper limit of measurement device
**calculated by considering the volume of rectangular cuboids or cylinder the dimensions shown on the Table 1 above Comparison of Reactor Performance According to CFD Calculations FIG. 1 depicts the calculated reactor pressure drop (calculated using air at 25° C. and 1 bar$_a$ after the packing and 1 m/s empty tube velocity) and the specific reactor surface area (geometric surface area of catalyst in a cubic meter of a reactor bed packed with catalyst pieces) for different shaped bodies. For commercial operation of the hydrocarbons reforming reactions (e.g. steam or dry or tri-methane-reforming) it is advantageous to achieve the lowest reactor pressure drop possible with the highest geometric surface area possible.

FIG. 1 compares the performance of 1) a Quattro tablet with height×diameter 10×1 mm, 2) a Quattro tablet with height×diameter 16×10 mm, 3) micro extrudate cube with fiber stacking ABAB (with direct line of sight) with height× width 10×10 mm, and 4) micro extrudate cube with fiber stacking ABCD (with no direct line of sight) with height× width 10×10 mm.

FIG. 1 shows that the micro-extrudated geometries have a significantly higher specific surface area and a low reactor pressure drop in comparison to the commercial geometry. Clearly the stacking configuration can have an influence on the reactor pressure drop.

The invention claimed is:

1. A method for producing a three-dimensional porous catalyst monolith of stacked catalyst fibers, comprising the following steps:
   a) Preparing a suspension paste in a liquid diluent of particles of a catalyst A, which comprises at least nickel-magnesium mixed oxide and magnesium spinel and aluminum oxide hydroxide, wherein the nickel-magnesium mixed oxide has an average crystallite size of ≤100 nm, the magnesium spinel phase has an average crystallite size of ≤100 nm, the proportion of nickel in the catalyst is in the region of 30 mol %, the proportion of magnesium is in the range 8-38 mol %, and the proportion of aluminum is in the range 50-70 mol % and the intensity of the diffraction reflection of the catalyst at 43.09° 2θ is less than or equal to the intensity of the diffraction reflection at 44.82° 2θ, or of a hexaaluminate-comprising catalyst B, which comprises cobalt and at least one further metal selected from the group consisting of Ba, Sr, La, or of precursors of catalyst A or B, and which suspension can furthermore comprise 1 to 15 wt %, based on the suspension paste, of a binder material, selected from the group of organic and inorganic binders and mixtures thereof, all particles in the suspension having an average particle size in the range of from 0.5 to 500 μm,
   b) extruding the paste of step a) through one or more nozzles to form fibers, and depositing the extruded fibers to form a three-dimensional porous catalyst monolith precursor,
   c) drying the porous catalyst monolith precursor to remove the liquid diluent,
   d) calcining the porous catalyst monolith precursor to form the porous catalyst monolith,
   wherein in step b) the nozzles have a maximum diameter of from 0.5 to less than 5 mm and the three-dimensional porous catalyst monolith precursor is formed by depositing the extruded fibers in a regular, recurring stacking pattern.

2. The method of claim 1, wherein the nickel-magnesium mixed oxide has an average crystallite size of ≤40 nm, the magnesium spinel phase has an average crystallite size of ≤40 nm, the proportion of nickel in the catalyst is in the region of 30 mol %, the proportion of magnesium is in the range 23-35 mol %, and the proportion of aluminum is in the range 50-70 mol % and the intensity of the diffraction reflection of the catalyst at 43.09° 2θ is less than or equal to the intensity of the diffraction reflection at 44.82° 2θ, with the intensity of the diffraction reflection being less than the intensity of the reflection at 44.72° 2θ.

3. The method of claim 1, wherein the BET surface area of catalyst A is in the range from 2 to 500 m$^2$/g, and/or the starting materials for producing the catalyst comprise a nickel-comprising salt and a hydrotalcite-comprising compound.

4. The method of claim 3, wherein the fusible metal salt comprises a nickel salt and/or cobalt salt and/or wherein process step (ii) is carried out simultaneously with step (iii), and/or wherein the thermal treatment of step (iii) and the low-temperature calcination of the mixture in process step (iv) is carried out in one coherent process step, and/or wherein the fusible metal salt is present in the form of the metal melt when carrying out step (i).

5. The method of claim 4, wherein the fusible metal salt is nickel nitrate hexahydrate.

6. The method of claim 1, wherein the BET surface area of catalyst A is in the range from 5 to 76 m$^2$/g,
   and/or the starting materials for producing the catalyst comprise a nickel nitrate hexahydrate and hydrotalcite.

7. The method of claim 1, wherein for the particles of catalyst A the production process comprises the following steps:
   contacting of a fusible metal salt and finely divided hydrotalcite-comprising starting material,
   (ii) intimate mixing of the fusible metal salt and the hydrotalcite-comprising starting material,
   (iii) thermal treatment of the fusible metal salt and the hydrotalcite-comprising starting material and heating of the mixture under conditions under which the metal salt is present in the form of a metal salt melt, at a temperature in the range from 30 to 250° C.,
   (iv) low-temperature calcination of the mixture at a temperature of <500° C., with the duration of the low-temperature calcination being in the range from 0.1 to 24 hours,
   (v) molding or shaping,
   (vi) high-temperature calcination of the mixture at a temperature of >500° C., with the duration of the high-temperature calcination being in the range from 0.1 to 24 hours,
   wherein step (v) can be identical with steps b) and c) and wherein step (vi) can be identical with step d).

8. The method of claim 7, wherein catalyst B is prepared by the following process
- (i) producing of an aluminum source,
- (ii) divided aluminum source with a fusible or soluble Co-comprising compound and at least one further soluble or fusible metal salt selected from the group consisting of Ba, La, Sr,
- (iii) intimate mixing of the aluminum source and the dissolved or molten metal salts,
- (iv) drying of the mixture,
- (v) low-temperature calcination of the mixture,
- (vi) molding or shaping,
- (vii) high-temperature calcination, wherein step (vi) can be identical with steps b) and c) and wherein step (vii) can be identical with step d), or wherein catalyst B is prepared by a process which comprises the following steps:
- (i) contacting of a finely divided aluminum oxide source, preferably in the form of dispersible primary particles having a primary particle size of less than or equal to 500 nm, with a metal salt which comprises at least soluble or fusible cobalt- and lanthanum-comprising species,
- (ii) intimate mixing of the aluminum oxide source and the dissolved or molten metal salt,
- (iii) drying of the mixture,
- (iv) low-temperature calcination of the mixture,
- (v) molding or shaping,
- (vi) high-temperature calcination, wherein step (v) can be identical with steps b) and c) and wherein step (vi) can be identical with step d).

9. The method of claim 1, wherein for the particles of catalyst A the production process comprises the following steps:
- contacting of a fusible metal salt and finely divided hydrotalcite-comprising starting material,
- (ii) intimate mixing of the fusible metal salt and the hydrotalcite-comprising starting material,
- (iii) thermal treatment of the fusible metal salt and the hydrotalcite-comprising starting material and heating of the mixture under conditions under which the metal salt is present in the form of a metal salt melt, at a temperature in the range from 50 to 140° C.,
- (iv) low-temperature calcination of the mixture at a temperature in the range from 250 to 500° C., with the duration of the low-temperature calcination being in the range from 0.1 to 24 hours,
- (v) molding or shaping,
- (vi) high-temperature calcination of the mixture at a temperature in the range from 700 to 1200° C., with the duration of the high-temperature calcination being in the range from 0.1 to 24 hours, wherein step (v) can be identical with steps b) and c) and wherein step (vi) can be identical with step d).

10. The method of claim 9, wherein the high-temperature calcination is carried out at a temperature in the range 800-1300° C., and/or the duration of the high-temperature calcination is greater than 0.5 h, and/or wherein the low-temperature calcination is carried out at a temperature of <550° C., and for a time in the range from 0.1 to 24 h, and/or wherein the molding or shaping (process step (vi)) is carried out before the drying step (iv) and/or drying step (iv) if carried out together with low-temperature calcination step (v), and/or wherein at least one of the process steps (i) to (iii) in carried out in the presence of seed crystals and the proportion of seed crystals is in the range from 0.1 to 10% by weight.

11. The method of claim 1, wherein catalyst B is a hexaaluminate-comprising catalyst B, where the hexaaluminate-comprising phase comprises cobalt and at least one further metal from the group consisting of Ba, Sr, La, where the Co content is in the range 2-15 mol %, the content of further metal from the group consisting of Ba, Sr, La is in the range 2-25 mol %, and the content of Al is in the range 70-90 mol % and the catalyst has an oxidic secondary phase in the range 0-50% by weight, and the BET surface area of the hexaaluminate-comprising catalyst is greater than 2 $m^2/g$.

12. The method of claim 1, wherein catalyst B is a hexaaluminate-comprising catalyst B, where the hexaaluminate-comprising phase comprises cobalt and at least one further metal from the group consisting of Ba, Sr, La, where the Co content is in the range 4-8 mol %, the content of further metal from the group consisting of Ba, Sr, La is in the range 4-10 mol %, and the content of Al is in the range 70-90 mol % and the catalyst has an oxidic secondary phase in the range 5-30% by weight, selected from the group consisting of theta-aluminum oxide, alpha-aluminum oxide, $LaAlO_3$, $BaAl_2O_4$, $SrAl_2O_4$, $CoAl_2O_4$, La-stabilized aluminum oxides, La-stabilized aluminum oxide hydroxide, and the BET surface area of the hexaaluminate-comprising catalyst is greater than 15 $m^2/g$.

13. The method of claim 1, wherein the regular, recurring stacking pattern is composed of stacked layers of extruded fibers, wherein in each layer at least 50 wt % of the extruded fibers are deposited parallel to each other and spatially separated from each other, or in a cobweb pattern, wherein at least 50 wt % of the extruded fibers are deposited as linear strands parallel to each other and spatially separated from each other, or wherein multiple cobweb patterns are stacked, wherein the direction of the strands in each layer is different from the direction in neighboring layers, so that a porous structure with contact points of strands of neighboring layers results.

14. The method according to claim 1, wherein a binder material is employed, selected from the group consisting of clays, alumina, silica or mixtures thereof.

15. The method according to claim 1, wherein the drying is performed at a temperature in the range of from −100 to 1000° C.

16. The method according to claim 1, wherein in step b) the nozzles have a diameter of less than 1 mm, preferably from 0.5 to 0.8 mm.

17. The method according to claim 1, wherein the fiber diameter in the monolith is from 0.5 to 0.9 mm.

18. The method according to claim 1, wherein the monolith has a crushing strength in the stacking direction of a least 60 N and wherein the determination of the crushing strength is performed as disclosed in Oil & Gas Science and Technology-Rev. IFP, Vol. 55 (2000), No. 1, pp. 67-85.

* * * * *